United States Patent Office 2,757,075
Patented July 31, 1956

2,757,075

STABILIZATION OF SULFUR

Jerome N. Haimsohn, Ardsley, N. Y.

No Drawing. Application March 15, 1954,
Serial No. 416,421

7 Claims. (Cl. 23—224)

This invention relates to the treatment of sulfur which contains an appreciable percentage of insoluble sulfur to prevent the insoluble sulfur from reverting to the ordinary or soluble form. Insoluble sulfur is well-known to those skilled in the art and is sulfur which has been polymerized so that it is no longer soluble in carbon disulfide. Sulfur containing from 30% to 100% of insoluble sulfur has a number of industrial uses and is frequently employed in the manufacture of synthetic rubber products, as an insecticide, and for similar purposes. After the sulfur has been rendered insoluble, there is a tendency for the sulfur to revert to the soluble form, which must be prevented, if the sulfur is to retain its useful properties.

It is therefore an object of the present invention to provide a means for preventing the reversion of sulfur to the insoluble form.

In the past, various methods have been proposed for rendering sulfur insoluble, such as set forth in Patents 2,460,365 and 2,462,146. However, the process and compounds of the present invention are more effective for rendering the sulfur insoluble than any method heretofore known to applicant.

When insoluble sulfur is formed, the sulfur is converted from its normal crystalline form, which consists of an eight-membered ring, to polymers of extremely long chain length. Thus, many thousand sulfur molecules may join in a chain of indeterminate length and it is these long sulfur chains which have the property of being insoluble in carbon disulfide. However, these long chains of insoluble sulfur have an unsatisfied electron structure, thus making the chain unstable, so that unless something is done to satisfy the electron requirements of the chain, the sulfur will revert to the ordinary soluble form. The trace quantities of impurities, normally present in the various methods of manufacture, provide a variety of chain endings which impart varying degrees of stability to the insoluble sulfur. In general, the stability of the product so obtained is far from satisfactory. The present invention relates to the addition of a substance to the sulfur which is highly reactive with the chain ends, and which forms a stable compound, preventing depolymerization of the sulfur.

In accordance with the present invention, it has been found certain organic compounds which have an olefinic linkage and which are capable of forming free radicals, are effective stabilizers for insoluble sulfur. The generation of free radicals from such compounds may occur spontaneously or may be induced by thermal, photo-chemical, or similar processes. The compounds of the present invention, in addition to stabilizing the insoluble sulfur so that its rate of reversion to the soluble form is substantially reduced, can also render the sulfur insoluble. In the formation of insoluble sulfur, sulfur chains of various lengths are formed. Those molecules above a certain chain length range are insoluble in carbon disulfide, those of shorter chain lengths being soluble. The short chain material may polymerize (combine with other linear sulfur molecules) to form insoluble sulfur which, if properly terminated, will remain insoluble. Alternatively, the short-chain material may depolymerize to yield ordinary eight-membered ring soluble sulfur, or if terminated while in short chains, will remain stable but soluble. It is necessary, therefore, to introduce the stabilizing agents at the appropriate stage of the process to attain a maximum fraction of insoluble sulfur with strongly bound chain endings.

With the compounds of this invention present, the rate of combination of short chain material to a stabilized insoluble (long chain) sulfur exceeds the rate of depolymerization to the soluble form, making it possible to actually increase the percentage of insoluble obtained.

The compounds which have been found to be effective possess the following structural formula:

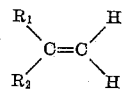

wherein $R_1$ is an alkyl, alkenyl, aryl, alkaryl, aralkyl, or substituted aryl group and $R_2$ is hydrogen or a member selected from the same class, which may be the same or different from $R_1$. Such substances must have from 4 to 18 carbon atoms and may be solids, liquids or gases.

Insoluble sulfur may be made in different ways, as is well-known to those skilled in the art. For various typical methods in which insoluble sulfur can be made, reference is made to Patents 2,419,309, 2,419,310, 2,513,524 and 2,534,063. The compounds of the present invention may be introduced at various stages of the process, but are preferably introduced into a slurry of insoluble sulfur in carbon disulfide. The carbon disulfide may then be evaporated from the sulfur, leaving a dry sulfur in insoluble form.

Compounds may be introduced either directly, or in $CS_2$ solution, onto the wet sulfur cake on a filter or centrifuge to provide the final wash for the sulfur when processing to dissolve the soluble sulfur from the insoluble portion in order to produce a substantially pure insoluble sulfur. Upon evaporation of the $CS_2$, the stabilizer remains with the insoluble sulfur, imparting to it stability to reversion to the soluble form. In these applications the less volatile members are preferred in that there will be a lesser tendency for them to evaporate with the $CS_2$ when that solvent is removed.

The compounds may be introduced also to the insoluble sulfur in the dry state by forcing the vapors through or over the sulfur.

Another method of introducing the compounds of the present invention into the sulfur is to introduce the compounds into the hot sulfur vapor as in the process described in U. S. Patent 2,419,310. If this method is employed, the more volatile members are preferred.

One common method of making insoluble sulfur is by quenching sulfur, in liquid or vapor form, in liquids such as carbon disulfide or aqueous acid baths, as set forth in Patents 2,419,310 and 2,513,524, respectively. If this method is used the compounds are merely added to the quenching medium prior to or after the introduction of the sulfur to the liquid medium. Alternatively, the compounds may be added to the quenched slurry upon discharging from the quenching vessel after the insoluble sulfur has attained its hard, non-plastic, well-dispersed condition. Sulfur produced by these methods is not only rendered insoluble, but the compounds of the present invention stabilize it so that it does not readily revert to soluble sulfur.

Insoluble sulfur can also be made by the reaction of sulfur dioxide with hydrogen sulfide. If this method is employed, the compounds of the present invention are preferably added after the reaction has taken place.

The stabilization of insoluble sulfur to reduce reversion of the insoluble form to the soluble form is important both during the manufacturing process ("in process" reversion), and in the finished product ("long-term" reversion). The compounds of the present invention are effective in both applications, as exemplified by the aforementioned methods. In order to ensure maximum "long-term" stability of the finished product, effective concentrations of the compounds in the sulfur should be maintained in the final processing stages before packaging, whether or not they are introduced in the earlier stages of the process. Depending on the manufacturing process, it may be preferable to use one compound during or immediately after the quenching operation and another compound during the finishing stages to most effectively minimize the "in-process" and "long-term" reversions, respectively.

*Example 1.*—The following illustrates preferred methods of practicing the present invention. In this series of tests, a slurry consisting of insoluble sulfur in carbon bisulfide was prepared and 0.2% of the desired compound was added to the slurry. The carbon bisulfide slurry was agitated for four hours and then allowed to evaporate, leaving behind the sulfur with the stabilizing agent intact. The dried samples were then subjected to elevated temperatures for varying periods of time. Such elevated temperatures are known to hasten the depolymerization of sulfur, and the conditions were selected to be as unfavorable as possible to the stability of the sulfur. The following results were obtained.

| Compound | Percent Loss after 40 hours at 90° F. |
|---|---|
| dodecene | 0.7 |
| tetradecene | 1.8 |
| octadecene | 0.8 |
| alpha-methyl styrene | 0.2 |
| indene | 0.5 |
| isoprene | 1.0 |
| vinyl toluene | 0.2 |
| allyl benzene | 0.6 |
| butadiene | 1.3 |
| dicyclopentadiene | 0.7 |
| styrene | 0.2 |
| chloroprene | 0.6 |
| divinyl benzene | 0.3 |
| 1-vinyl-3-cyclohexane | 1.5 |
| 2,5-dichlorostyrene | 0.4 |
| p-vinyl biphenyl | 0.4 |
| p-methyl styrene | 0.3 |
| none | 2.5 |

*Example 2.*—In another series of tests sulfur vapor carried by stream of inert gas (nitrogen) after being picked up by the inert gas in a pot of molten sulfur held near its boiling point, was passed through a vertical air-cooled condenser tube. The sulfur which collected on the cool wall of the condenser tube, was removed at the end of the run for analysis for insoluble sulfur content.

Using the same equipment, with all conditions being maintained essentially identical, comparisions were made with and without the introduction of the stabilizing compound to the sulfur vapor-inert gas stream.

| Stabilizing Compound | No. of Runs | Average Insoluble Sulfur Content of Product |
|---|---|---|
| None | 5 | 7±2% |
| Butadiene | 6 | 26±1% |
| Isoprene | 2 | 24±3% |

While it is recognized that the system employed in these tests is relatively inefficient for producing insoluble sulfur, it served to demonstrate the effectiveness of the compounds in rendering the sulfur insoluble.

*Example 3.*—In a series of tests sulfur vapor at a temperature of 500° C. was introduced at the rate of 0.5 pound per hour onto the surface of a moderately agitated quenching liquid consisting of one gallon of carbon disulfide. The slurry of sulfur and $CS_2$ immediately upon discharge from the quenching vessel was divided into two equal portions. The stabilizing compounds were added to one portion; the other was used as a control. Both the test and control slurry batches were agitated for 20 hours at room temperature for the purpose of aging. The slurries were then transferred to open drying vessels and the $CS_2$ allowed to evaporate. The dried product was ground and sifted to produce a uniform product, then aged for two days and subjected to analysis. The compounds of the instant invention yielded a product higher in I. S. content and more stable to reversion.

| Stabilizing Agent | Percent I. S. after aging for 2 days | Percent Reversion, 20 hr. at 140° F. |
|---|---|---|
| Run 1: | | |
| None | 45.7 | 3.9 |
| Alpha-Methylstyrene | 51.1 | 0.9 |
| Run 2: | | |
| None | 44.0 | 4.3 |
| Isoprene | 48.3 | 2.3 |

I claim:

1. A process for reducing the rate of reversion of that form of sulfur which is insoluble in carbon disulfide to that form which is soluble in carbon disulfide comprising adding to sulfur a compound of the formula

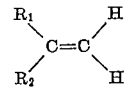

wherein $R_1$ is a member selected from the group consisting of alkyl, alkenyl, aryl, alkaryl, aralkyl and substituted aryl radicals and $R_2$ is a member selected from the group consisting of the hydrogen atom, alkyl, alkenyl, aryl, alkaryl, aralkyl and substituted aryl radicals, said compound having from four to eighteen carbon atoms.

2. A process for reducing the rate of reversion of that form of sulfur which is insoluble in carbon disulfide to that form which is soluble in carbon disulfide comprising adding to sulfur about 0.2% by weight of alpha-methyl styrene.

3. A process for reducing the rate of reversion of that form of sulfur which is insoluble in carbon disulfide to that form which is soluble in carbon disulfide comprising adding to sulfur about 0.2% by weight of vinyl toluene.

4. A process for reducing the rate of reversion of that form of sulfur which is insoluble in carbon disulfide to that form which is soluble in carbon disulfide comprising adding to sulfur about 0.2% by weight of styrene.

5. A process for reducing the rate of reversion of that form of sulfur which is insoluble in carbon disulfide to that form which is soluble in carbon disulfide comprising adding to sulfur about 0.2% by weight of divinyl benzene.

6. A process for reducing the rate of reversion of that form of sulfur which is insoluble in carbon disulfide to that form which is soluble in carbon disulfide comprising adding to sulfur about 0.2% by weight of p-methyl styrene.

7. A process for stabilizing insoluble sulfur comprising forming a slurry of insoluble sulfur in carbon disulfide, adding to the slurry about 0.2% by weight, based on the weight of sulfur, of a compound having the formula

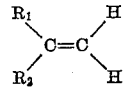

wherein $R_1$ is a member selected from the group consisting of alkyl, alkenyl, aryl, alkaryl, aralkyl and substituted aryl radicals and $R_2$ is a member selected from the group consisting of the hydrogen atom, alkyl, alkenyl, aryl, alkaryl, aralkyl and substituted aryl radicals, said compound having from four to eighteen carbon atoms.

References Cited in the file of this patent

UNITED STATES PATENTS 2,462,146  Walcott et al. _____ Feb. 22, 1949

OTHER REFERENCES

Karrer: "Organic Chemistry," 2nd edition, 1946, page 59.